United States Patent
Sills et al.

(10) Patent No.: US 12,543,058 B2
(45) Date of Patent: Feb. 3, 2026

(54) IN-NETWORK ACCESS POINT BASED WIRELESS INTERFERENCE DETECTION

(71) Applicant: Calix, Inc., San Jose, CA (US)

(72) Inventors: Daniel J. Sills, Moss Beach, CA (US); Eric I. Leal, Richardson, TX (US); Harold A. Roberts, Excelsior, MN (US)

(73) Assignee: Calix, Inc., San Jose, CA (US)

( * ) Notice: Subject to any disclaimer, the term of this patent is extended or adjusted under 35 U.S.C. 154(b) by 356 days.

(21) Appl. No.: 18/148,747

(22) Filed: Dec. 30, 2022

(65) Prior Publication Data

US 2024/0224091 A1   Jul. 4, 2024

(51) Int. Cl.
*H04W 24/08*   (2009.01)

(52) U.S. Cl.
CPC .................. *H04W 24/08* (2013.01)

(58) Field of Classification Search
None
See application file for complete search history.

(56) References Cited

U.S. PATENT DOCUMENTS

| | | | | |
|---|---|---|---|---|
| 2012/0236731 A1* | 9/2012 | Beaudin | ............ | H04W 72/541 370/248 |
| 2014/0328264 A1 | 11/2014 | Merlin et al. | | |
| 2016/0113026 A1* | 4/2016 | Ezri | ............ | H04W 16/10 370/329 |
| 2016/0262164 A1* | 9/2016 | Gresset | ............ | H04W 72/541 |
| 2018/0027552 A1* | 1/2018 | Jeong | ............ | H04W 72/52 370/336 |

(Continued)

FOREIGN PATENT DOCUMENTS

| | | |
|---|---|---|
| EP | 3247157 A1 | 11/2017 |
| WO | 2016011918 A1 | 1/2016 |
| WO | WO-2020083299 A1 * | 4/2020 ........... H04B 17/345 |

OTHER PUBLICATIONS

Chen et al., "Site-Specific Knowledge and Interference Measurement for Improving Frequency Allocations in Wireless Networks", IEEE Transactions on Vehicular Technology, vol. 58, No. 5, Jun. 2009. (Year: 2009).*

(Continued)

*Primary Examiner* — Faruk Hamza
*Assistant Examiner* — Cassandra L Decker
(74) *Attorney, Agent, or Firm* — Shumaker & Sieffert, P.A.

(57) ABSTRACT

An access point for interference detection includes memory configured to store information identifying one or more non-associated client devices that are not configured to communicate with the access point, and one or more processors, implemented in circuitry, coupled to the memory and configured to: determine that communication signals outputted from a non-associated client device to another access point or from the other access point to the non-associated client device are being received by the access point based on the stored information, determine an amount of in-network interference being generated by the communication signals based at least in part on the determination that the communication signals from the non-associated client device or from the other access point are being received by the access point, and output interference information based on the determined amount of in-network interference.

19 Claims, 5 Drawing Sheets

(56) References Cited

U.S. PATENT DOCUMENTS

2018/0287739 A1* 10/2018 Kim ................... H04J 11/0023
2021/0068076 A1* 3/2021 Henry ................. H04W 16/20

OTHER PUBLICATIONS

International Search Report and Written Opinion of International Application No. PCT/US2023/084995 dated Apr. 26, 2024, 13 pp.
Response to Written Opinion dated Apr. 26, 2024 from International Application No. PCT/US2023/084995 filed Oct. 28, 2024, 14 pp.
International Preliminary Report on Patentability from International Application No. PCT/US2023/084995 dated Nov. 26, 2024, 18 pp.
Notice of Intent to Grant and Text Intended to Grant from counterpart European Application No. 23848074.3 dated Oct. 31, 2025, 48 pp.

\* cited by examiner

IN-NETWORK ACCESS POINT BASED WIRELESS INTERFERENCE DETECTION

TECHNICAL FIELD

This disclosure relates to networking, and more particularly, communication between client devices and access points in a wireless network.

BACKGROUND

A wireless network, such as a wireless network configured for operation in accordance with the Wi-Fi protocols, includes access points and client devices. One or more processors may be configured to select a channel on which the access points and the client devices wirelessly communicate. For example, the one or more processors may determine interference on two or more channels, and select the channel having the least amount of interference as the channel on which the access points and client devices wirelessly communicate.

DETAILED DESCRIPTION

Figure 1A:
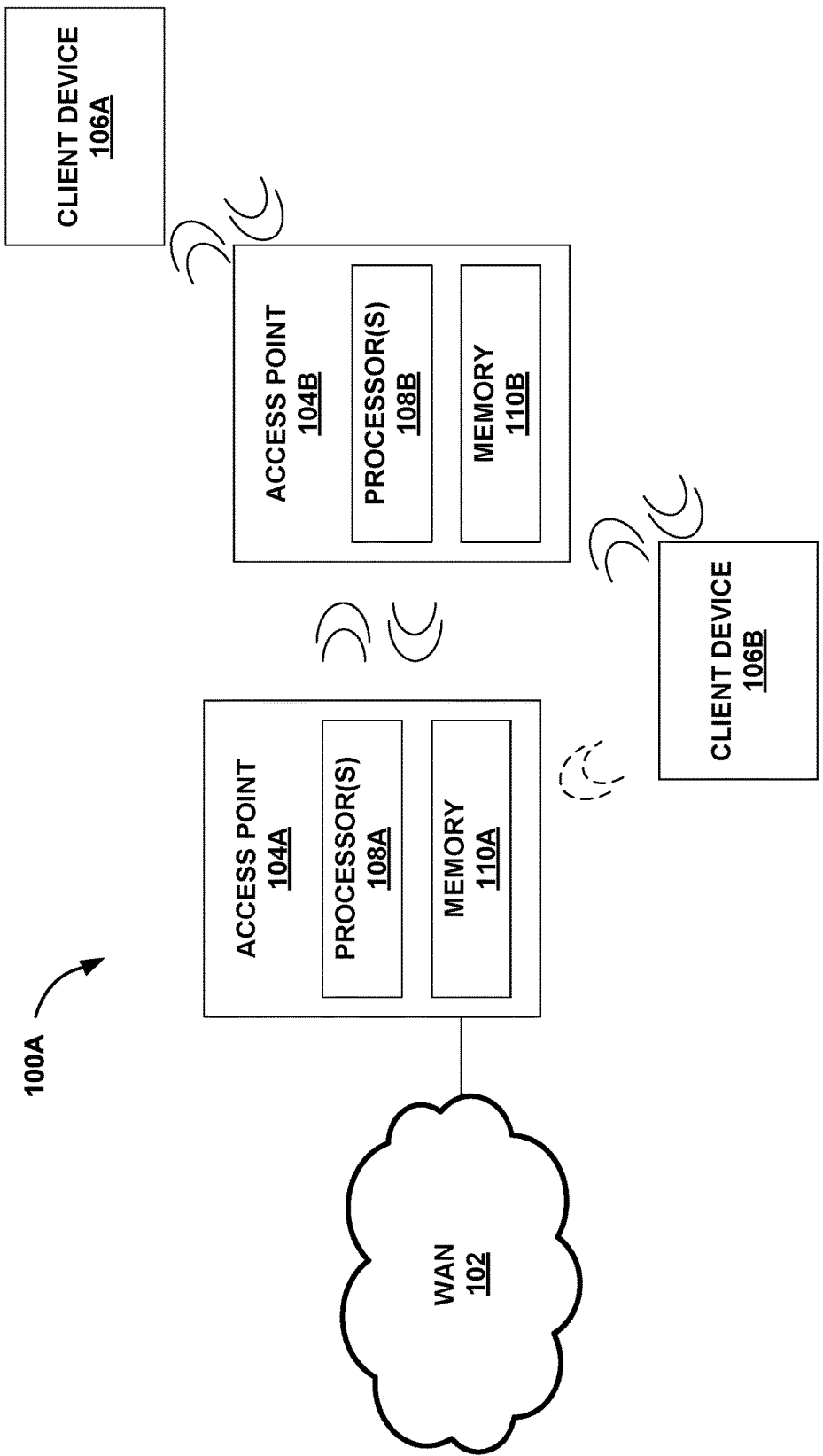
FIGS. 1A-1C are block diagrams illustrating example wireless networks, in accordance with one or more aspects of this disclosure.

A wireless network includes one or more access points and one or more client devices. For communication, each client device may be associated with one of the access points. For instance, in one example wireless network topology, a first access point may be a gateway router that couples to a wide area network (WAN) (e.g., Internet). The first access point may communicate with a plurality of other access points (e.g., within a premises), and the plurality of other access points may wirelessly communicate with one or more client devices (e.g., computers, smartphones, tablets, smart watches, Internet of Things (IOT) devices, etc.). The plurality of other access points may be routers, extenders, repeaters, and the like. The first access point may also wirelessly communicate with one or more client devices.

The client devices and access points may wirelessly communicate on a particular channel. A controller may be configured to identify the channel on which the client devices and access points are to communicate. The controller may be part of an access point (e.g., the gateway router), may be located remotely in a cloud computing environment, or may be distributed across components of a premises.

To determine a channel on which the client devices and access points are to communicate, the access points may be configured to determine interference on a plurality of channels, and output such information to the controller. The controller may then select the channel based on one or more metrics, such as the channel with the least interference or other metrics.

In a wireless network with a single access point that provides coverage for the entire premise, one or more processors of the single access point may be able to distinguish interference from valid data communication signals transmitted or received by the single access point. For instance, if the received communication signal is not recognized as coming from an associated client device of the single access point, the received communication signal may be considered as interference.

For ease of understanding, this disclosure describes the various access points and client devices using familial terminology. For example, a current access point may be configured to communicate with one or more associated client devices. These client devices may be considered as "children" of the current access point because they are associated with the current access point.

The current access point may be configured to communicate with other access points. These other access points may be considered as "sisters" of the current access point. These other access points (e.g., sister access points) may be configured to communicate with their own associated client devices. However, the client devices associated with the sister access points may be considered as non-associated client devices to the current access point. The non-associated client devices are not configured to communicate with the current access point, but are configured to communicate with other access points (e.g., respective sister access points). From the perspective of the current access point, the non-associated client devices may be considered as "nieces" of the current access point.

The phrase "not configured to communicate" refers to a current network topology in which client devices are associated with access points. In the current network topology, a client device may be associated with a particular access point, and communicates with that access point and does not communicate with other access points. In this current network topology, for a current access point, in the current network topology, there may be associated client devices and non-associated client devices, where the associated client devices are configured to communicate with the current access point, but the non-associated client devices are not (e.g., because they are not associated with the current access point). However, at some time later, there may be an update of which client devices should communicate with which access points (e.g., the client device moves locations and then associates with another access point). In this case, a client device that was previously not associated with a current access point and not configured to communicate with the current access point may later be associated with the current access point and configured to communicate with the current access point.

In examples where there are multiple access points with their own associate client devices, there may be multiple causes of interference. One example of the interference is in-network interference, also called friendly fire or phantom interference, as described in more detail below. Another example of the interference is foreign interference, which is interference from devices that are not part of the wireless network, or other components.

As an example of in-network interference, communication between a sister access point and a client device (e.g., niece client device) associated with the sister access point may be a cause of interference measured by the current access point. That is, because the communication between a sister access point and its children (e.g., nieces of the current access point) are not communication signals meant for the current access point, the current access point may qualify such communication signals as interference. The niece client device may be considered as a non-associated client device from the perspective of the current access point.

For instance, in examples where there are multiple access points, interference on the current access point may be due to other access points (i.e., sister access points) in the wireless network and the client device (e.g., nieces of the current access point) communicating with the sister access points, in addition to interference from devices that are not part of the wireless network. In this disclosure, interference at an access point due to client devices (e.g., niece client devices) and other access points (e.g., sister access points) communicating with one another is referred to as in-network interference, also called friendly fire interference or phantom interference, at the current access point. Interference at the current access point due to other sources (e.g., not in-network interference) is referred to as foreign interference or "true" interference. The combination of foreign interference and in-network interference may be referred to as total interference.

This disclosure describes example techniques for the one or more processors to determine how much of the interference at an access point is due to in-network interference. The one or more processors may distinguish between foreign interference and in-network interference to more accurately evaluate the interference on a channel.

Foreign interference refers to any radio frequency power within the band of the channel(s) actively being used by the network that includes the access points and client devices, of an amplitude high enough to degrade in-network communication, that is not due to communication within the network (i.e., between the access points and client devices within the network). Examples of foreign interference include but are not limited to: microwave oven, baby monitors, neighboring Wi-Fi networks, Bluetooth communications, etc.

In one or more examples, determining the actual foreign interference, rather than relying on the total interference, may allow the controller tasked with changing a channel in a network to more accurately select a channel on which the access points and the client devices are to communicate. For example, the controller may receive interference measurements from the access points for multiple channels, and determine whether access points and the client devices that form a network are to switch channels (e.g., because there is a channel with less interference). When evaluating channel interference for a current channel, the controller may determine the total interference on the current channel (e.g., foreign interference and in-network interference). When evaluating channel interference on another channel, since the other channel is not in use for in-network communication, there may be no in-network interference, and only foreign interference. In-network communication refers to communication within a network on which a determination is made whether to switch channels.

However, if the controller switches the channel from the current channel to the other channel, then the in-network interference that was present on the current channel may (e.g., will) also become present on the other channel. This is because the access points and client devices that generated the in-network interference on the current channel should generate the in-network interference on the other channel.

Accordingly, in-network interference may be considered as the interference that travels when there is a switch in channels. For example, in-network interference is interferences in devices on a common network where the communication channel on the devices changes together. The total interference may include both the foreign interference and the in-network interference.

For instance, an access point may be communicating on a first channel. Without accounting for in-network interference, the controller may receive information of a total interference for each access point on the first channel (e.g., the total interference includes in-network interference and foreign interference). The controller may also receive information of a total interference for each access point on a second channel. In this case, as there is no in-network communication on the second channel, there may be no in-network interference, and only foreign interference.

In some scenarios, because the access points measured only foreign interference on the second channel, the interference on the second channel may be measured as being less than the interference on the first channel. In response, the controller may switch one or more of the access points from communicating on the first channel to communicating on the second channel. However, in this case, the in-network interference that was present on the first channel should transfer to the second channel as the access points and client devices communicate on the second channel. For example, the in-network interference was due to the client devices and access points communicating with one another on the first channel. When the one or more processors switch to the second channel, the in-network interference may now be present on the second channel due to the client devices and access points communicating on the second channel.

Accordingly, in some examples, an interference on a second channel may appear to be artificially lower than the interference on a first (e.g., current channel) because the in-network interference is not yet present. By distinguishing between in-network interference and foreign interference, the controller may be configured to compare the foreign interference on the first channel to the interference on the second channel to more accurately determine whether the second channel has less overall interference than the first channel.

In one or more examples described in this disclosure, a current access point may be configured to determine an amount of in-network interference and total interference. The current access point may output, to the controller, information indicative of the net amount of interference (e.g., foreign interference) based on a subtraction of the in-network interference from the total interference (e.g., (total interference)−(in-network interference)). In some examples, the current access point may output, to the controller, information indicative of the amount of total interference and the amount of in-network interference, and the controller may determine the net (e.g., foreign) interference. In both examples, the current access point may be considered as outputting interference information based on the determined amount of in-network interference (e.g., the net interference or the actual in-network interference).

As another example, determining an amount of in-network interference may include classifying interference as in-network interference or foreign interference. To output interference information based on the determined amount of in-network interference may include the current access point outputting amount of foreign interference based on the classification. That is, the determination of amount of in-network interference may be classifying interference, and based on the classification of the interference, the current access point may output information indicative of the foreign interference.

There may be various example ways in which the current access point may determine an amount of in-network interference begin generated by the non-associated client device or another access point (e.g., non-associated client device and/or the other access point are communicating with another). As one example, in addition to information identifying one or more associated client devices, the current access point may store information identifying one or more non-associated client devices that are not configured to communicate with the current access point. One example of the information identifying the one or more non-associated client devices is media access control (MAC) addresses. That is, an access point includes memory that stores MAC addresses identifying one or more niece client devices (e.g., non-associated client devices) that are not configured to communicate with the current access point and MAC addresses identifying one or more children client devices (e.g., associated client devices).

The access point may receive communication signals and process the communication signals, such as determine MAC addresses, measure power, etc. In one or more examples, an access point may receive a communication signal, and from the MAC address in the communication signal, may determine that the communication signal originated from a non-associated client device (e.g., niece client device). For example, the access point may access the stored information identifying non-associated client devices, and determine that the source MAC address in the communication signal matches a MAC address stored in the memory and identified as being a MAC address of a non-associated client device. Similarly, an access point may receive a communication signal, and from the MAC address in the communication signal, may determine that the communication signal is destined for a non-associated client device (e.g., niece client device). For example, the access point may access the stored information identifying non-associated client devices, and determine that the destination MAC address in the communication signal matches a MAC address stored in the memory and identified as being a MAC address of a non-associated client device.

In this way, the access point (e.g., the current access point) may determine that communication signals outputted from a non-associated client device (e.g., niece client device) to another access point (e.g., sister access point) or from the other access point to the non-associated client device are being received by the access point based on the stored information. In this example, the access point (e.g., current access point) may determine an amount of in-network interference being generated by the communication signals based at least in part on the determination that the communication signals from the non-associated client device or from the other access point are being received by the access point (e.g., current access point). As one example, the access point (e.g., current access point) may determine information indicative of airtime usage of the non-associated client device and the other access point. The airtime usage of the non-associated client device may the amount of time the non-associated client device or other access point was transmitting at a high enough power level that the current access point could measure the power level (e.g., at a high enough power level that such communication would interfere with the ability of the current access point to communicate). That is, in some examples, the access point (e.g., current access point) may determine information indicative of airtime usage of the non-associated client device and the other access point, and amplitude (e.g., power level) of the communication signals from the non-associated client device or the other access point.

The amount of in-network interference may be based on the determined airtime usage, and possibly the amplitude. Also, the access point can determine when the non-associated client device is transmitting or receiving based on the stored MAC addresses. For instance, the access point may store information identifying client devices (associated or non-associated client devices) within the network of the access point. The network of the access point may refer to the devices in the network that switch channels together. There may be other client devices that are not part of the network of the access point, and the access point may not store MAC addresses for these other client devices that are not part of the network. This may be because these other client devices that are not part of the network form part of the foreign interference, and not the in-network interference. However, it may be possible for the access point to store MAC addresses for these other client devices as well.

The access point may output interference information based on the determined amount of in-network interference. The access point may determine a total interference on the access point. As one example, the access point may output information indicative of the total interference, and to output the interference information, the access point may output the determined amount of in-network interference. As another example, the access point determine a net interference (e.g., foreign interference) based on a difference between the total interference and the determined amount of in-network interference, and to output the interference information, the access point may output the net interference.

The above is described with respect to a current access point. In one or more examples, a subset or possibly all of the access points within a network may determine respective amounts of in-network interference, and may output respective interference information.

A controller may receive the respective interference information, and determine the respective foreign interference. For instance, if the controller received the net interference from the respective access points, the controller may set the respective foreign interference equal to the net interference from the respective access points. If the controller received the respective in-network interference information and the respective total interference information, the controller may determine the respective net interferences.

The controller may average (possibly weighted average) the respective net interferences, or use some other calculation, to determine the channel interference for the current channel. The controller may request from the access points information of the channel interference on other channels. As noted above, since there is no in-network communication on the other channels, the channel interference measured on the other channels may be the true interference. The controller may use the determine channel interference for the current channel and the channel interference measured on the other channels to determine whether to perform a channel switch. For instance, if there is a channel with less interference, the controller may determine to switch the access points and their respective client devices to the channel having less interference.

Figure 1B:
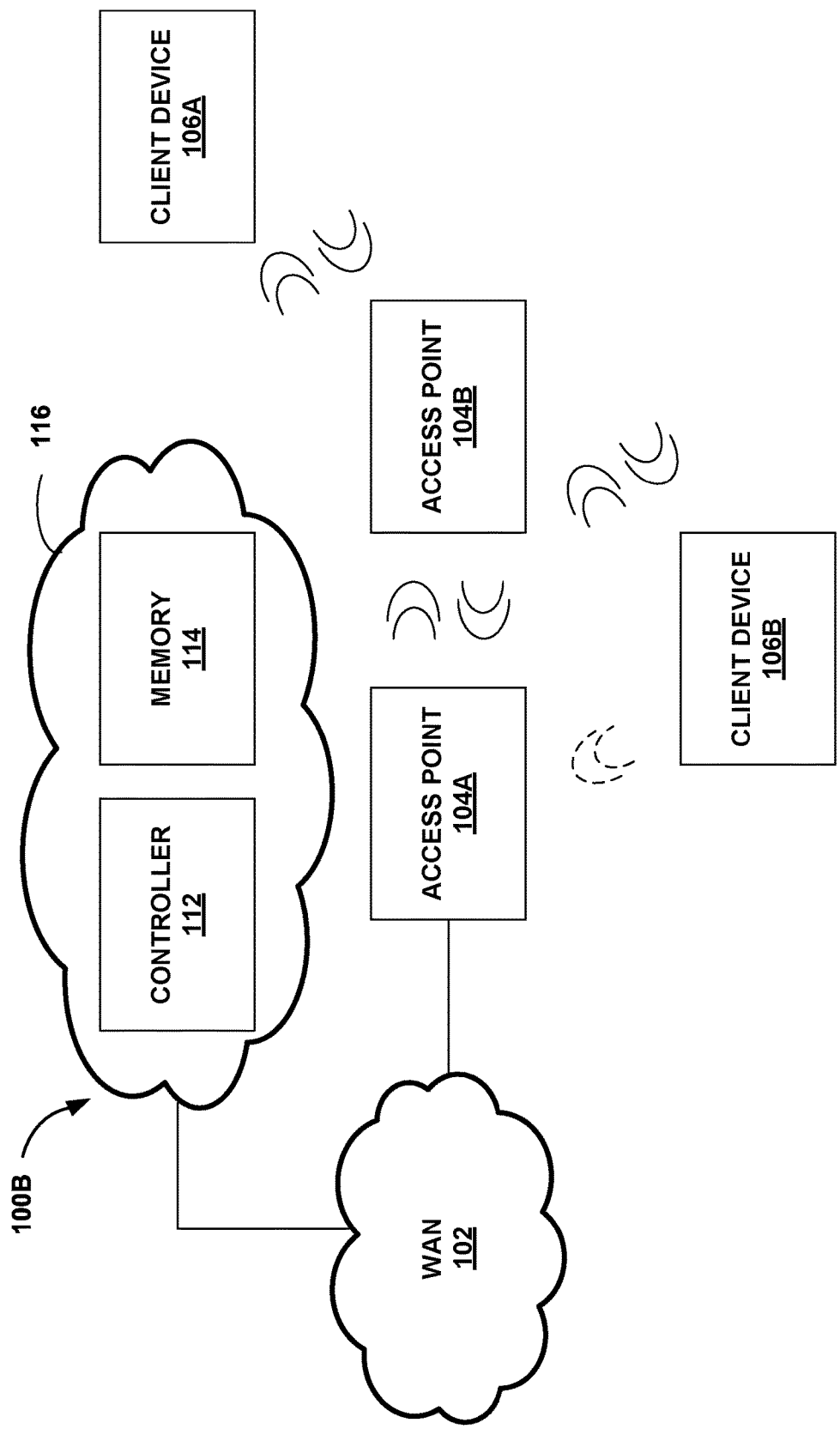
Figure 1C:
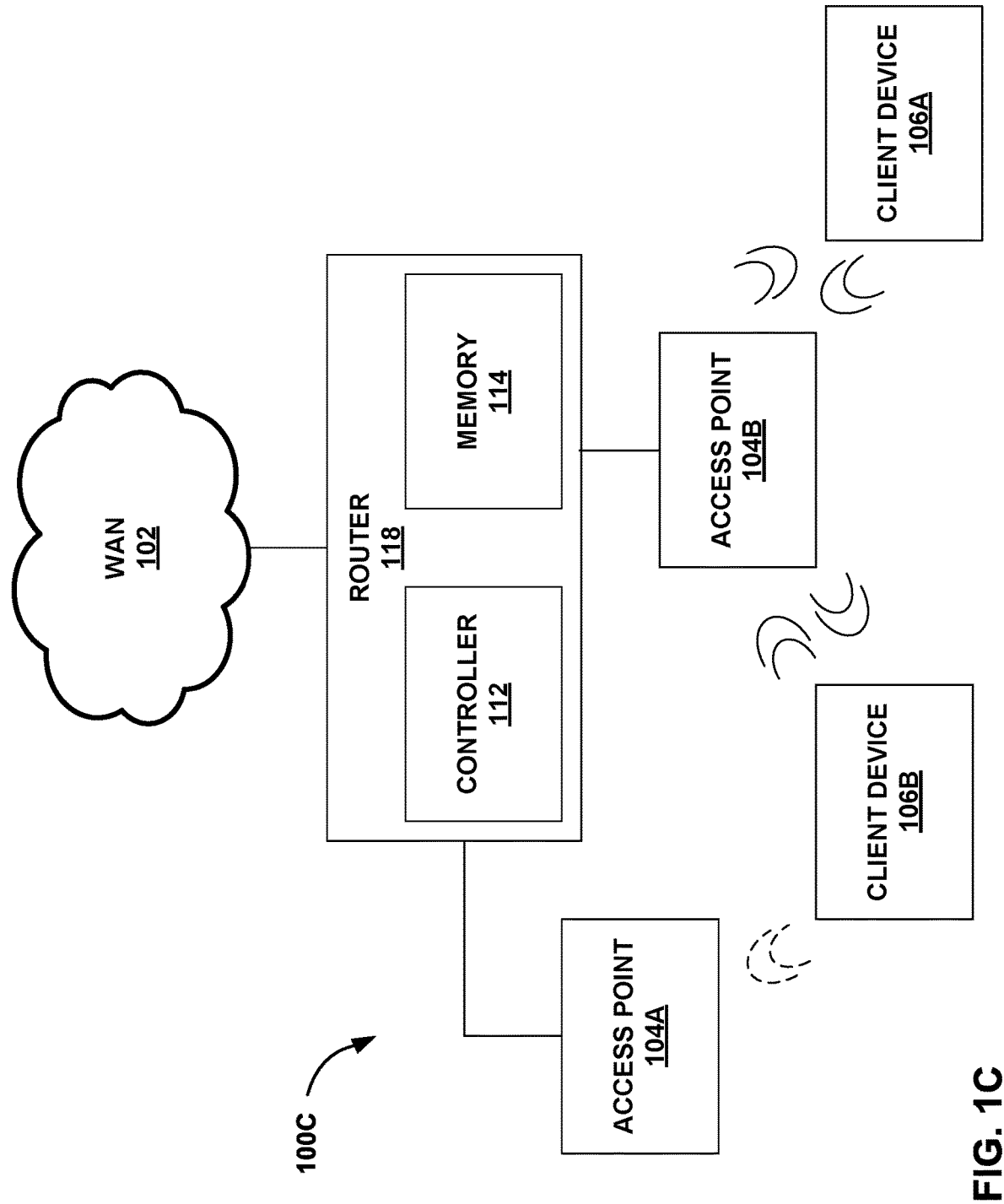

FIGS. 1A-1C are block diagrams illustrating example wireless networks, in accordance with one or more aspects of this disclosure. For instance, FIGS. 1A-1C illustrate wireless networks 100A-100C, respectively. Wireless networks 100A-100C may be multi-node channelized wireless networks, such as wireless networks that operate in accordance with the Wi-Fi protocols. Wireless networks 100A-100C may be wireless networks within a premise, such as a home, school, business, etc. However, the example techniques are not limited to requiring wireless networks 100A-100C be located within a single premise, and may extend across multiple buildings.

Wireless networks 100A-100C include access point 104A, access point 104B, client device 106A, and client device 106B. Access points 104A, 104B may be networking hardware devices that provide wireless connectivity to client devices 106A, 106B. Examples of access points 104A, 104B include routers, extenders, repeaters, and the like. Examples of client devices 106A, 106B include subscriber devices that can communicate wirelessly such as computers, smartphones, smartwatches, tablet computing devices, Internet-of-Things (IOT) devices, and the like. Although, for simplicity of illustration, two access points 104A, 104B are illustrated, and two client devices 106A, 106B are illustrated, the example techniques are not so limited. There may be more access points 104, and more or fewer client devices 106 than illustrated.

As illustrated in FIGS. 1A-1C, wireless networks 100A-100C may communicate with WAN 102. One example of WAN 102 is the Internet. For instance, as illustrated in FIGS. 1A and 1B, access point 104A provides access to WAN 102 to other access points (e.g., access point 104B) and client devices 106A, 106B. In FIGS. 1A and 1B, access point 104A may be considered as a gateway access point (e.g., AP-G). Access point 104B may be considered as a repeater access point (e.g., AP-R).

As illustrated in FIG. 1C, router 118 provides access to WAN 102 to access points 104A, 104B and client devices 106A, 106B. Router 118 may be coupled to access points 104A, 104B through a cabled (e.g., wired) connection, such as fiber optic cable, Ethernet cable, twisted pair cable, coaxial cables, etc.). For instance, in an enterprise setting, router 118 may be coupled to access points 104A, 104B through a cabled connection, and access points 104A, 104B may communicate with respective client devices 106A, 106B wirelessly. However, it is possible for router 118 to communicate with access points 104A, 104B wirelessly as well.

FIG. 1A illustrates access point 104A including one or more processors 108A and memory 110A, and access point 104B including one or more processors 108B and memory 110B. Although FIGS. 1B and 1C do not illustrate access points 104A and 104B including one or more processors 108A and 108B or memory 110A and 110B, respectively, access points 104A and 104B in FIGS. 1B and 1C may be the same as access points 104A and 104B in FIG. 1A.

FIGS. 1B and 1C illustrate controller 112 and memory 114. In one or more examples, controller 112 (e.g., based on information stored in memory 114) may be configured to determine whether channel switching is appropriate in networks 100B and 100C. For instance, controller 112 may be considered as a network controller that is configured to manage networks 100B and 100C. Controller 112 and memory 114 are not illustrated in FIG. 1A because, in some examples, the functionality of controller 112 and memory 114 may be performed by one or more of processors 108A or 108B or distributed therebetween. As an example, one or more processors 108A may be configured to perform the network controller operations of controller 112, and in addition perform the example techniques described in this disclosure.

Examples of one or more processors 108A and 108B and controller 112 include one or more digital signal processors (DSPs), general purpose microprocessors, application specific integrated circuits (ASICs), field programmable logic arrays (FPGAs), or other equivalent integrated or discrete logic circuitry. Accordingly, the term "processor" or "controller" as used herein may refer to any of the foregoing structure or any other structure suitable for implementation of the techniques described herein. Also, the techniques could be fully implemented in one or more circuits or logic elements (e.g., such as in an integrated circuit (IC) or a set of ICs). Examples of memory 110 or memory 114 include RAM, ROM, EEPROM, optical disk storage, magnetic disk storage, flash memory, and the like.

As noted above, in the example of FIG. 1A, the functionality of controller 112 may be part of one or more processors 108A or 108B and functionality of memory 114 may be part of memory 110A or memory 110B, which are part of access point 104A. For instance, access point 104A may be a gateway access point, and may be configured to monitor and analyze wireless network 100A. For instance, access point 104A may be configured to select a channel on which access points 104A, 104B and client devices 106A, 106B are to communicate. For case of description only, when referring to the example of FIG. 1A, the functionality of controller 112 is described as being part of one or more processors 108A, but the techniques are not so limited, and the functionality may be part of one or more processors 108B, or distributed therebetween.

In the example of FIG. 1B, controller 112 and memory 114 may be part of cloud computing environment 116, e.g., within one or more servers. Cloud computing environment 116 may provide storage and computing power for wireless network 100B. For instance, controller 112 and memory 114 may be distributed across cloud computing environment 116. In one or more examples, in addition to providing storage and computing power to wireless network 100B, cloud computing environment 116 may monitor and analyze wireless network 100B (e.g., monitor bandwidth, determine whether any of access points 104A, 104B or client devices 106A, 106B are not operating correctly, assign client devices 106A, 106B to access points 104A, 104B, and the like). In some examples, cloud computing environment 116 (e.g., via controller 112) may be configured to select a channel on which access points 104A. 104B and client devices 106A, 106B are to communicate.

In the example of FIG. 1C, router 118 includes controller 112 and memory 114. For instance, in an enterprise, router 118, which may be a gateway router, may be configured to analyze and monitor wireless network 100C (e.g., with controller 112). In some examples, router 118 may be configured to select a channel on which access points 104A, 104B and client devices 106A, 106B are to communicate. In some examples, router 118 may be a wired device that is coupled to access points 104, 104B through a wired connection, but the techniques are not so limited.

As described above, one or more processors 108A (e.g., in FIG. 1A) or controller 112 (e.g., in FIGS. 1B and 1C) may be configured to select a channel on which access points 104A, 104B and client devices 106A, 106B are to communicate (e.g., on which at least one of access points 104A, 104B is to communicate). A channel refers to a particular frequency at which access points 104A, 104B and client devices 106A, 106B communicate. For instance, the IEEE 802.11 standard provides radio frequency ranges for wireless communication that include 900 MHZ, 2.4 GHz, 3.6 GHz, 4.9 GHZ, 5 GHZ, 5.9 GHZ, 6 GHZ, and 60 GHz bands, as a few examples. Each frequency range is divided into multiple channels, where the channels are numbered at 5 MHz spacing within a band, with 60 GHZ band having channels with 2.16 GHz spacing.

To determine a channel on which access points 104A, 104B and client devices 106A, 106B are to communicate, one or more processors 108A or controller 112 may select a channel such that interference from nearby networks and other sources is mitigated. One example technique to select the channel is to measure the amount of interference there is on a given channel (e.g., either from Wi-Fi sources, such as in nearby networks, or non-Wi-Fi sources, such as household appliances).

There may be various example ways to measure the amount of interference. In one or more examples, access points 104A, 104B determine the amount of interference, and report such information to one or more processors 108A (e.g., for FIG. 1A) or to controller 112 (e.g., for FIGS. 1B and 1C). One or more processors 108A and/or controller 112 may select the channel based on the amount of interference reported (e.g., outputted) from respective ones of access points 104A and 104B.

As one example, one or more processors 108A and 108B may evaluate whether received communication is packetized in accordance with Wi-Fi protocols, and if not, one or more processors 108A or 108B may determine that the received communication is interference. As another example, in the event that the received communication is packetized in accordance with Wi-Fi protocols, one or more processors 108 may evaluate whether the received communication was sent from a client device with which the receiving access point is associated (e.g., based on the packet header). If the packet header does not match a client device associated with the receiving access point, one or more processors 108A or 108B may determine that the received communication is interference. However, as described in more detail, in some examples, one or more processors 108A and 108B may quantify such interference as in-network interference assuming the communication signal originated from an in-network client device. There may be other ways in which to measure interference, and the example techniques should not be considered limited to the examples described herein.

One or more processors 108A and 108B may measure the amount of interference on a current channel and measure the amount of interference on other, target channels. If the interference is lower on one of the other channels, one or more processors 108A (e.g., for FIG. 1A) or controller 112 (e.g., for FIGS. 1B and 1C) may select the other channel as the channel on which access points 104A, 104B and client devices 106A, 106 should communicate. If the interference lower on the current channel, there may not be a switch from the current channel. Switching to the channel having the lower or lowest interference is one example. There may be other metrics that can be used in combination with the interference to determine whether to switch channels.

In examples where there is only one access point (e.g., only one of access points 104A, 104B), any interference on a channel at the access point may be from foreign sources, referred to as foreign interference. Also, the foreign interference would be present on the other channels as well. However, in examples where there are multiple access points, such as in FIGS. 1A-1C, communication to and from client devices 106A, 106B associated with one of the access points (e.g., access point 104B) may appear to be interference to an access point (e.g., access point 104A) that is not associated with a client device.

As an example, assume that access point 104A is a current access point. Although not illustrated, access point 104A may communicate with one or more client devices associated with access point 104A (i.e., the children client devices of access point 104A). Access point 104B may be considered as a sister access point from the perspective of access point 104A. Client devices 106A and 106B, which are children client devices to access point 104B, may be considered as niece client devices to access point 104A. For instance, client devices 106A and 106B are non-associated client devices, from the perspective of access point 104A, but are associated client devices of access point 104B.

In the examples of FIGS. 1A-1C, client devices 106A, 106B may be associated with access point 104B. Accordingly, client devices 106A, 106B may transmit and receive communication signals from access point 104B, and access point 104B may transmit and receive communication signals from client devices 106A, 106B. Access point 104A may not be associated with either of client devices 106A, 106B. Access point 104A may communicate (e.g., transmit and receive communication) from access point 104B.

In the examples of FIGS. 1A-1C, due to the proximity of access point 104A to client device 106B, as illustrated in dashed lines, communication signals that client device 106B transmits to access point 104B may also be measured as interference by access point 104A. That is, because access point 104A is not associated with client device 106B, the transmission from client device 106B to access point 104B appears as interference to access point 104A.

In this disclosure, interference measured at access point 104A that originates due to one or more client devices 106A, 106B communicating with access points 104B or vice-versa is referred to as in-network interference. That is, interference measured at an access point due to communication between client devices and other access points is referred to as in-network interference, such as interference that transfers to another channel when communication is switched from the current channel to the other channel. In this disclosure, interference measured at access point 104A that originates outside of wireless networks 100A-100C is referred to as foreign interference, true interference, or actual interference.

For instance, assume there is another access point, with a client device on this other access point. In such as example, when this other access point is communicating with the other access point, there may not be in-network interference on access point 104A because to the extent there is interference, the cause of interference is not from communication between access points 104A, 104B and client devices 106A, 106B of wireless networks 100A-100C that includes access points 104A, 104B and client devices 106A, 106B. In this case, such interference may be considered as foreign interference. Other examples of foreign interference include microwave oven, baby monitors, neighboring Wi-Fi networks, Bluetooth communications, etc.

Accordingly, one or more processors 108A may determine total interference at access point 104A on a first channel and one or more processors 108B may determine total interference at access point 104B, where the total interference includes foreign interference and in-network interference. In some techniques, based on the total interference, one or more processor 108A (for FIG. 1A) or controller 112 (for FIGS. 1B and 1C) may determine whether to switch communication of access points 104A, 104B and client devices 106A, 106B from the first channel to a second channel. For example, one or more processors 108A or controller 112 may periodically determine "free airtime." Free airtime may be a measure of how much additional overhead is available in the event that additional bandwidth needs to be allocated. If the free airtime is less than a threshold value, one or more processors 108A or controller 112 may determine whether to switch channels to a channel where there is possibly more free airtime.

As one example, one or more processors 108 may determine an amount of time (e.g., a first time value) that interference is present within a time period. One example of the time period is 1000 milliseconds. One or more processors 108 may determine an amount of time within that time period of airtime usage of access points 104A, 104B and client devices 106A, 106B (e.g., a second time value). The airtime usage of access points 104A, 104B and client devices 106A, 106B may be the amount of time that client devices 106A, 106B are communicating (e.g., transmitting and receiving) and the amount of time that access points 104A, 104B are communicating (e.g., transmitting and receiving). The free airtime is the summation of the first time value and the second time value subtracted from the time period (e.g., 1000 millisecond). For instance, if the first time value (e.g., amount of time that interference is present within a time period) is 200 milliseconds, the second time value (e.g., airtime usage of access points 104A, 104B and client devices 106A, 106B) is 500 milliseconds, and the time period is 1000 milliseconds, the free airtime is 300 milliseconds (e.g., 1000 milliseconds−(200 milliseconds+500 milliseconds)).

Using free airtime as criteria for determining whether to switch communicating on a first channel (e.g., current channel) to a second channel (e.g., another channel) is one example and should not be considered as limiting. In some examples, one or more processors 108A or controller 112 may periodically determine whether to switch channels.

As described above, in some examples, one or more processors 108A or controller 112 may utilize the total interference for determining whether to switch channels. However, there may be errors in using total interference.

For example, assume that the current channel is a first channel, and a target channel is a second channel. One or more processors 108A and 108B may determine the total interference for the first channel for respective access points 104A and 104B, which includes the foreign interference on the first channel and the in-network interference on the first channel. One or more processors 108A and 108B may then determine the interference on the second channel for respective access points 104A and 104B. However, because access points 104A, 104B and client devices 106A, 106B are not communicating on the second channel in wireless networks 100A-100C, there may be no in-network interference on the second channel (e.g., in-network second channel). In this example, one or more processors 108A and 108B may determine the foreign interference on the second channel, and determine the foreign interference as the total interference on the second channel, as there may be no in-network interference.

If one or more processors 108A or controller 112 determine that the interference on the second channel is less than the interference on the first channel, one or more processors 108A or controller 112 may cause access points 104A, 104B, and client devices 106A, 106B to communicate on the second channel. In this case, the in-network interference that was present on the first channel, but not yet present on the second channel when the interference determination was made for the second channel, may transfer from the first channel and on to the second channel. This is because the in-network interference is from access points 104A, 104B and client device 106A, 106B communicating with one another, and access points 104A, 104B and client device 106A, 106B now communicate with one another on the second channel. Accordingly, the total interference on the second channel should increase. However, in the determination to switch from the first channel to the second channel, one or more processors 108A or controller 112 failed to account for the in-network interference.

Accordingly, one or more processors 108A or controller 112 may use interference measurements on the current channel to factor into a decision to change the channel to a better (lower interference) channel. The problem with in-network interference is that when access points 104A, 104B and client devices 106A, 106B change channel, the in-network interference follows to the new channel since the in-network interference is on the communication between access points and client devices (which may be all on the same channel).

Therefore, in-network interference makes the current channel look worse than it is. Since a site scan for better channels may not include in-network interference, the alternative channels look better than they really are, compared to the current channel, in terms of interference. This can cause a thrashing of channel changes in an attempt by one or more processors 108A or controller 112 to escape the in-network interference generated by the system itself.

In one or more examples, one access point 104B associated with client devices 106A, 106B may be referred to as a basic subscriber set (BSS). In cases where there are multiple access points (e.g., access points 104A, 104B) providing coverage such as extenders or repeaters (e.g., access point 104B is an extender or repeater) in addition to a root access point or gateway (e.g., access point 104A), wireless network 100A-100C may be referred to as an extended BSS (EBSS).

An EBSS node may determine the transmit and receive traffic from its own BSS and the associate airtime that is used. For example, access point 104A may track the amount of time that access point 104A transmits traffic (e.g., data) to and receives traffic from access point 104B (e.g., airtime usage of access point 104B).

In accordance with one or more examples described in this disclosure, one or more processors 108A and 108B of access points 104A and 104B, respectively, may be configured to determine an amount of in-network interference (e.g., in addition to total interference) on access points 104A and 104B. One or more processors 108A and 108B may output interference information based on the determined amount of in-network interference. In the example of FIG. 1A, one or more processors 108A may internally output interference information based on the determined amount of in-network interference on access point 104A, and one or more processors 108B may output interference information to one or more processors 108A based on the determined amount of in-network interference on access point 104B. In the example of FIGS. 1B and 1C, one or more processors 108A may output interference information to controller 112 based on the determined amount of in-network interference on access point 104A, and one or more processors 108B may output interference information to controller 112 based on the determined amount of in-network interference on access point 104B.

As an example, one or more processors 108A or controller 112 receives interference information of respective access points 104A and 104B periodically. The period may be P seconds long (e.g., 10 seconds) for each one of access points 104A and 104B. Each P-second long period may be referred to as a window. For instance, access points 104A and 104B may transmit the respective interference information during respective one of the windows (e.g., in a wall-clock-aligned fashion). The interference information may be a difference between the total interference and the in-network interference (e.g., net interference) or may be the total interference and the in-network interference transmitted as separate values, from which one or more processors 108A or controller 112 can determine the net interference.

During a window, there may be multiple instances of interference information (i.e., a tranche of interference information) that access points 104A and 104B transmit. For example, over a 10 second period, for every second, access points 104A and 104B may transmit their respective interference information. One or more processors 108A or controller 112 may determine multiple instances of the net interference over the window, and perform some mathematical operation (e.g., average) to determine respective net interference over the window for each of access points 104A and 104B.

Described another way, after receiving a tranche of interference information that applies to the nth window, one or more processors 108A or controller 112 determines a net interference that plagued each one of access points 104A and 104B during the nth window. One or more processors 108A or controller 112 may utilize the respective net interference on each of access points 104A and 104B for a current channel to determine whether to switch from the current channel to another channel. One or more processors 108A or controller 112 may utilize various factors, in addition to respective net interference, determine whether to switch channels, and the example techniques described in this disclosure are not limited to a particular technique for determining whether to switch channels.

Accordingly, the interference information based on the determined amount of in-network interference (e.g., the tranche of interference information) may include total interference, also called home channel gross interference (HCGI), measured by each one of access points 104A and 104B during the nth window, and in-network interference, also called orthogonal friendly fire interference (OFFI), plaguing each one of access points 104A and 104B during the nth window. One or more processors 108A or controller 112 may determine the net interference, also called home channel net interference (HCNI), that plagues each one of access points 104A and 104B using the following equation:

$$HCNI(R, n) = HCGI(R, n) - OFFI(R, n).$$

In the above equation, n refers to the nth window and R refers to one of access points 104A or 104B. HCNI(R,n) refers to the net interference for access point R (e.g., one of access points 104A or 104B) over the nth window. HCGI(R,n) refers to the total interference (e.g., gross interference) for access point R (e.g., one of access points 104A or 104B) over the nth window. OFFI(R,n) refers to the in-network interference that plagues access point R (e.g., one of access points 104A or 104B) over the nth window.

In some examples, it may not be possible for the net interference to be less than 0. Therefore, the above equation may be updated to:

$$HCNI(R, n) = MAX(0, (HCGI(R, n) - OFFI(R, n)).$$

In the above example, one or more processors 108A or controller 112 are described as receiving HCGI(R,n) (e.g., total interference) and OFFI(R,n) (e.g., in-network interference), and one or more processors 108A or controller 112 determine HCNI(R,n) (e.g., net or foreign interference). However, the techniques are not so limited. In some examples, one or more processors 108A or 108B may directly determine HCNI(R,n) and transmit such information to one or more processors 108A or controller 112.

That is, one or more processors 108A and 108B may determine total interference (HCGI(R,n)) and may be configured to output interference information based on the determined amount of in-network interference. In some examples, one or more processors 108A or 108B may output to the total interference, and to output the interference information, one or more processors 108A or 108B may output the determined amount of in-network interference (OFFI(R,n)). In some examples, one or more processors 108A or 108B may be configured to determine a net interference (HCNI(R,n) based on a difference between the total interference (HCGI(R,n)) and the determined amount of in-network interference (OFFI(R,n)), and to output the interference information, one or more processors 108A or 108B may be configured to output the net interference.

As another example, determining an amount of in-network interference may include one or more processors 108A or 108B classifying interference as in-network interference or foreign interference. To output interference information based on the determined amount of in-network interference, one or more processors 108A or 108B may output the amount of foreign interference based on the classification. That is, the determination of amount of in-network interference may be one or more processors 108A or 108B classifying interference, and based on the classification of the interference, one or more processors 108A or 108B may output information indicative of the foreign interference, which is the net interference or the true interference.

As described above, in one or more examples, access points 104A and 104B may determine the in-network interference on access points 104A and 104B. As one example, one or more processors 108A and 108B may determine that communication signals outputted from a non-associated client device (e.g., niece client device) to another access point (e.g., sister access point) or from the other access point (e.g., sister access point) to the non-associated client device (e.g., niece client device) are being received by the access point 104A or 104B.

For instance, one or more processors 108A may determine that communication signals outputted by client device 106B to access point 104B are being received by access point 104A. In this example, communication signals being "received by access point 104A" may mean that the power of the communication signals is sufficiently high that access point 104A can process the communication signal, such as parse the communication signal for MAC addresses or other such information. In some examples, the power level of the received communication signals not meant for access point 104A may be such that the communication signals would cause access point 104A to change output of communication signals from access point 104A due to concern that the received communication signal may interfere.

To determine that the communication signals, not meant for access point 104A, but originated or destined for devices within the network of access point 104A, memory 110A may store a database that includes MAC addresses of client devices 106 that are within the network, even if not associated with access point 104A. In this example, one or more processors 108A may determine whether a received communication signal conforms with Wi-Fi protocol. If not, one or more processors 108A may determine that the received communication signal is true interference.

If one or more processors 108A determine that the received communication signal conforms with Wi-Fi protocol, the one or more processors 108A may parse the MAC address (e.g., destination or source MAC address). One or more processors 108A may access memory 110A to determine whether parsed MAC address matches a stored MAC address. If there is a match, one or more processors 108A may determine whether the MAC address corresponds to a client device associated with access point 104A. If so, one or more processors 108A may perform actions in accordance with the commands in the communication signal. If not, one or more processors 108A may determine that the received communication signal is in-network interference.

Accordingly, in one or more examples, for one or more processors 108A to determine the in-network interference, one or more processors 108A may access memory 110A for information (e.g., MAC addresses) identifying one or more non-associated client devices that are not configured to communicate with the access point 104A. In some examples, memory 110A may also store information identifying each BSS emanated from a sister access point (e.g., the BSS emanating from access point 104B). The information identifying a BSS is a BSSID, which is a MAC address.

Non-associated client devices that are not configured to communicate with access point 104A refer to client devices that are associated with some other access point and use that access point for communication. It may be possible that at some future point a currently non-associated client device that is not configured to communicate with access point 104A becomes an associated client device of access point 104A and is configured to communicate with access point 104A.

One or more processors 108A may determine an amount of in-network interference being generated by the communication signals based at least in part on the determination that the communication signals from the non-associated client device or from the other access point are being received by the access point 104A. In one example, to determine the amount of in-network interference, one or more processors 108A may determine information indicative of airtime usage of the non-associated client device. In one example, to determine the amount of in-network interference, the one or more processors 108A may determine information indicative of airtime usage of the non-associated client device, and amplitude of the communication signals from the non-associated client device.

For example, one or more processors 108A may tabulate the total time consumed by all frames transmitted by its nieces (i.e., non-associated client devices) and/or all unicasted frames transmitted by sister access points (e.g., access point 104B) to children of access point 104B (e.g., client devices 106A, 106B), which are nieces of access point 104A. One or more processors 108A may also determine the amplitude (e.g., power level) of the frames transmitted by its nieces and sister access points that access point 104A receives. In some examples, one or more processors 108A may tabulate the total time consumed by all frames transmitted by its nieces or by sister access points having an amplitude that is greater than a threshold.

One or more processors may set the in-network interference equal to the total. In some examples, communications to and from client device 106A may not be received by access point 104A. In such examples, only client device 106B may contribute to the in-network interference.

In the above example, there may be times with a sister access point transmits non-unicast frames that are not accounted. Accounting for both source and destination MAC addresses can impact the network (e.g., cause delays, be difficult to implement, etc.). In some examples, in addition to or instead of monitoring both the source and destination MAC addresses, one or more processors 108A may determine a total time consumed by all frames transmitted by a niece client device (e.g., client device 106B). One or more processors 108A may also determine all frames transmitted by a BSS of a sister access point (e.g., access point 104B) (e.g., all frames with source address equal to the BSSID of any of the BSS of a sister access point).

In cases where access point 104A is associated to a BSS of a sister access point, then one or more processors 108A may subtract from the in-network interference the amount of time access point 104A is receiving unicast frames from a sister access point over a mutual BSS. For instance, one or more processors 108A may use the BSSID to determine the in-network interference from access point 104B. However, not all communication from access point 104B should be considered as interference, such as where access point 104B is in wireless communication with access point 104A. Therefore, one or more processors 108A may debit the amount of time access point 104A received unicast frames from access point 104B that were meant to be transmitted to access point 104A from the in-network interference measured as originating from access point 104B.

One or more processors 108A may output interference information based on the determined amount of in-network interference. As one example, determining an amount of in-network interference may include classifying interference as in-network interference and foreign interference. In some examples, to output interference information based on the determined amount of in-network interference, one or more processors 108A may output information based on the classification of in-network interference and foreign interference. As another example, one or more processors 108A may output the determined amount of in-network interference. As another example, one or more processors 108A may output a difference between the total interference and the determined amount of in-network interference.

The above examples are described with one or more processors 108A and memory 110A determining an amount of in-network interference on access point 104A. One or more processors 108B and memory 110B may be configured to perform similar operations to determine an amount of in-network interference on access point 104B.

Using the above example techniques, it may be possible for one or more processors 108A to directly measure in-network interference, rather than an indirect measurement based on statistics available on bytes sent/received and determination of physical layer rate that was being used during the time the bytes were sent/received. For instance, one or more processors 108A may directly measure the in-network interference instead of or in addition to inferring the in-network interference. Using inferential techniques, in addition to or combined with, the example direct measurement techniques to determine in-network interference is also possible.

Figure 2:
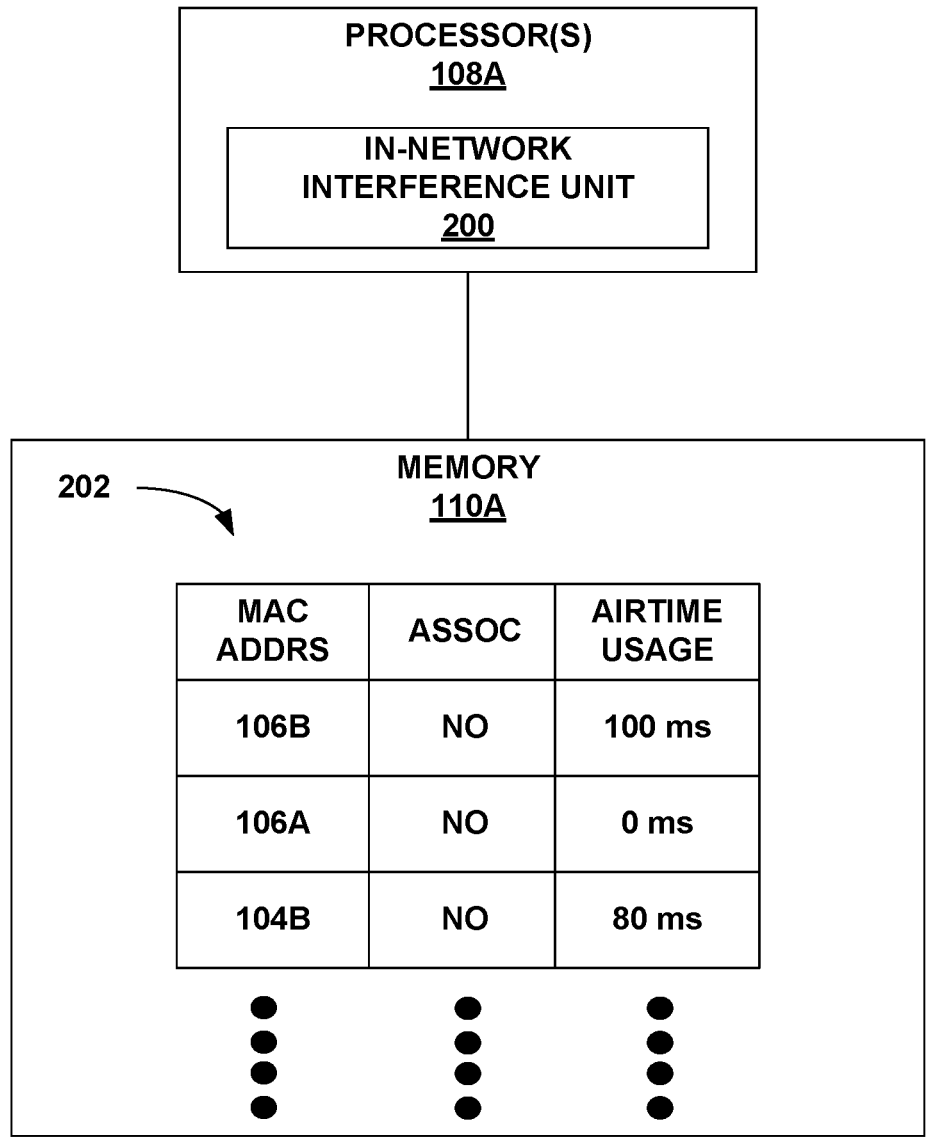
FIG. 2 is a block diagram illustrating an example of one or more processors and memory, in accordance with one or more aspects of this disclosure.

FIG. 2 is a block diagram illustrating an example of one or more processors and memory, in accordance with one or more aspects of this disclosure. For ease, FIG. 2 illustrates one or more processors 108A and memory 110A of access point 104A. One or more processors 108B and memory 110B of access point 104B may perform similar operations.

As illustrated in FIG. 2, one or more processors 108 include in-network interference unit 200. In-network interference unit 200 may be implemented as fixed-function circuitry or programmable circuitry (e.g., software executing on one or more processors 108A). In-network interference unit 200 may be configured to determine an amount of in-network interference begin generated by communication signals from a non-associated client device (e.g., niece client device) to another access point (e.g., sister access point) or from the other access point (e.g., sister access point) to the non-associated client device (e.g., niece client device). For instance, in-network interference unit 200 may be configured to determine the amount of in-network interference based on airtime usage of the non-associated client device and possibly the other access point.

FIG. 2 also illustrates memory 110A. As illustrated, memory 110A stores table 202, as one example. Table 202 includes MAC addresses of client devices that are part of the network of access point 104A. For instance, as shown, table 202 includes MAC address for client device 106A and for client device 106B even though client device 106A and client device 106B are non-associated with access point 104A. Also, table 202 includes BSSID (which is a form of MAC address) for access point 104B. Table 202 may include information indicating whether the MAC address is for an associated client device or not. Although not shown, in some examples, memory 110A may store total interference as well.

Table 202 may store airtime usage information as determined by in-network interference unit 200. For example, in-network interference unit 200 may determine that communication signals outputted from a non-associated client device to another access point or from the other access point to the non-associated client device are being received by the access point based on the stored information. For instance, in-network interference unit 200 may determine whether a parsed MAC address matches any of the MAC addresses of a non-associated device stored in memory 110A.

For communication signals originating from a non-associated device (e.g., client device 106B or access point 104B), in-network interference unit 200 may store airtime usage information. As noted above, the airtime usage information may be a tranche of airtime usage information, but for case a single value is shown in FIG. 2. For instance, to determine airtime usage information, in-network interference unit 200 may tabulate the total time consumed by all frames transmitted by its nieces (i.e., non-associated client devices) and/or all unicasted frames transmitted by sister access points (e.g., access point 104B) to children of access point 104B (e.g., client devices 106A, 106B), which are nieces of access point 104A. In some examples, in-network interference unit 200 may also determine all frames transmitted by a BSS of a sister access point (e.g., access point 104B) (e.g., all frames with source address equal to the BSSID of any of the BSS of a sister access point). In-network interference unit 200 may set the in-network interference equal to the total.

In the example of FIG. 2, the airtime usage of client device 106B is 100 milliseconds, and the airtime usage of access point 104B is 80 milliseconds. The airtime usage of access point 104B may reflect the result of subtracting airtime usage that was meant for access point 104A. Also, in FIG. 2, the airtime usage of client device 106A is shown as 0 milliseconds. This does not necessarily mean that client device 106A is not communicating. Rather, communication signals from client device 106A are not being received by access point 104A (e.g., due to distance from client device 106A).

Figure 3:
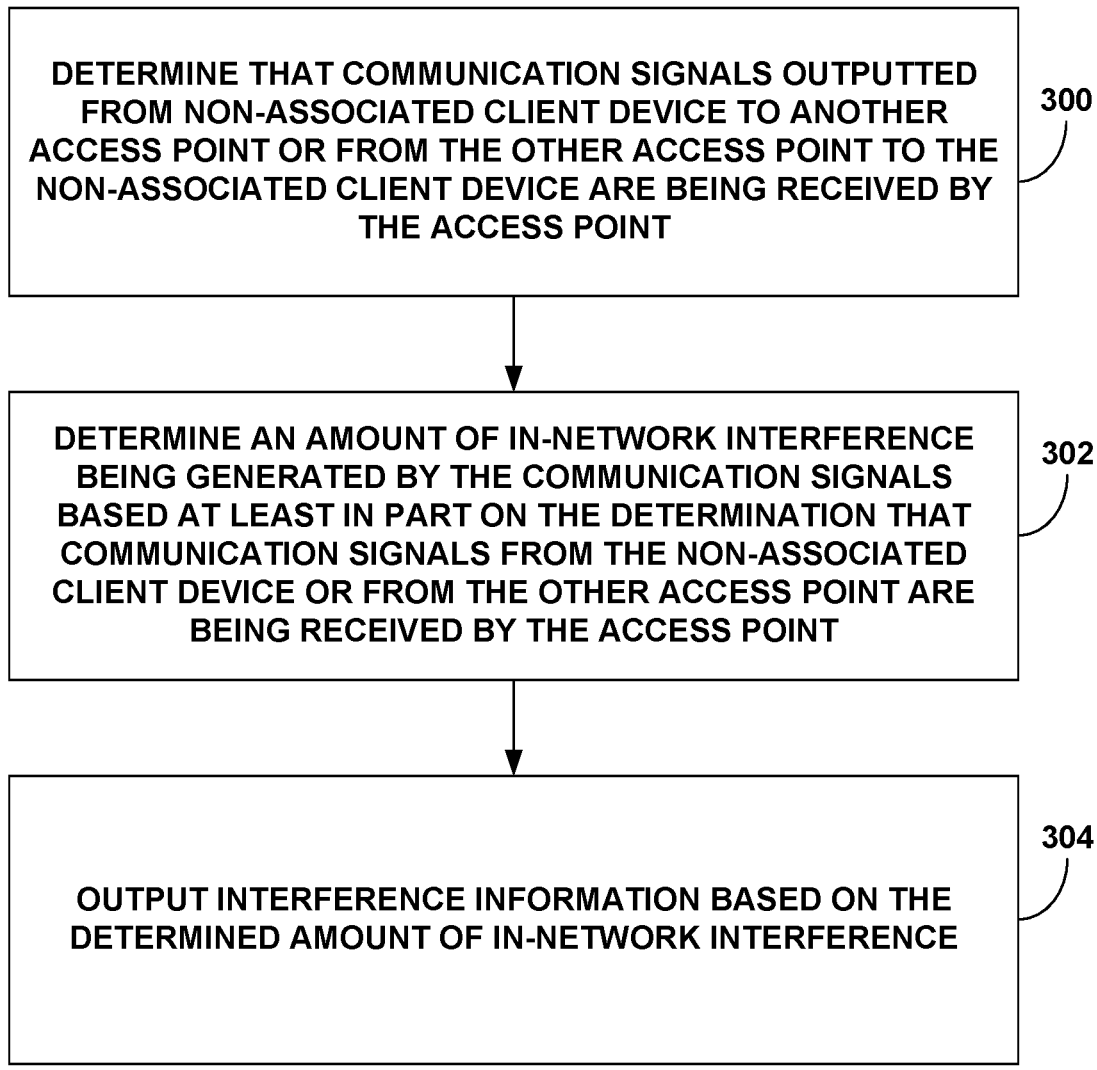
FIG. 3 is a flowchart illustrating example techniques, in accordance with one or more aspects of this disclosure.

FIG. 3 is a flowchart illustrating example techniques, in accordance with one or more aspects of this disclosure. The example of FIG. 3 is described with respect to one or more processors 108A and memory 110A, as non-limiting examples. One or more processors 108B and memory 110B may be configured to perform similar operations.

One or more processors 108A may determine that communication signals outputted from a non-associated client device to another access point or from the other access point to the non-associated client device are being received by the access point 104A based on the stored information (300). For example, memory 110A may store information identifying one or more non-associated client devices that are not configured to communicate with the access point 104A. The information identifying one or more non-associated client devices may be media MAC addresses of the one or more non-associated client devices. The communication signals outputted from the non-associate client device are on the same communication channel as a communication channel on which the access point 104A communicates.

One or more processors 108A may determine an amount of in-network interference being generated by the communication signals based at least in part on the determination that the communication signals from the non-associated client device or from the other access point are being received by the access point 104A (302). For example, to determine the amount of in-network interference, the one or more processors 108A are configured to determine information indicative of airtime usage of the non-associated client device or the other access point. As another example, to determine the amount of in-network interference, the one or more processors 108A are configured to determine information indicative of airtime usage of the non-associated client device or the other access point, and amplitude of the communication signals from the non-associated client device or the other access point.

One or more processors 108A may output interference information based on the determined amount of in-network interference (304). For instance, to output the interference information, the one or more processors 108A are configured to output the determined amount of in-network interference. One or more processors 108A may also determine and output the total interference on access point 104A. As another example, one or more processors 108A are configured to determine a net interference based on a difference between the total interference and the determined amount of in-network interference, and to output the interference information, the one or more processors 108A are configured to output the net interference.

The following describes example techniques in accordance with one or more examples described in this disclosure. The example techniques may be utilized together or separately.

Example 1. An access point for interference detection, the access point comprising: memory configured to store information identifying one or more non-associated client devices that are not configured to communicate with the access point; and one or more processors, implemented in circuitry, coupled to the memory and configured to: determine that communication signals outputted from a non-associated client device to another access point or from the other access point to the non-associated client device are being received by the access point based on the stored information; determine an amount of in-network interference being generated by the communication signals based at least in part on the determination that the communication signals from the non-associated client device or from the other access point are being received by the access point; and output interference information based on the determined amount of in-network interference.

Example 2. The access point of example 1, wherein the communication signals outputted from the non-associate client device are on the same communication channel as a communication channel on which the access point communicates.

Example 3. The access point of any of examples 1 and 2, wherein the one or more processors are configured to determine a total interference on the access point.

Example 4. The access point of example 3, wherein the one or more processors are configured to output information indicative of the total interference, and wherein to output the interference information, the one or more processors are configured to output the determined amount of in-network interference.

Example 5. The access point of any of examples 3 and 4, wherein the one or more processors are configured to determine a net interference based on a difference between the total interference and the determined amount of in-network interference, and wherein to output the interference information, the one or more processors are configured to output the net interference.

Example 6. The access point of any of examples 1-5, wherein to determine the amount of in-network interference, the one or more processors are configured to determine information indicative of airtime usage of the non-associated client device or the other access point.

Example 7. The access point of any of examples 1-6, wherein to determine the amount of in-network interference, the one or more processors are configured to determine information indicative of airtime usage of the non-associated client device or the other access point, and amplitude of the communication signals from the non-associated client device or the other access point.

Example 8. The access point of any of examples 1-7, wherein the information identifying one or more non-associated client devices comprises media access control (MAC) addresses of the one or more non-associated client devices.

Example 9. A method for interference detection, the method comprising: determining, for an access point, that communication signals outputted from a non-associated client device to another access point or from the other access point to the non-associated client device are being received by the access point based on stored information; determining an amount of in-network interference being generated by the communication signals based at least in part on the determination that the communication signals from the non-associated client device or from the other access point are being received by the access point; and outputting interference information based on the determined amount of in-network interference.

Example 10. The method of example 9, wherein the communication signals outputted from the non-associate client device are on the same communication channel as a communication channel on which the access point communicates.

Example 11. The method of any of examples 9 and 10, further comprising determining a total interference on the access point.

Example 12. The method of example 11, further comprising: outputting information indicative of the total interference, and wherein outputting the interference information comprises outputting the determined amount of in-network interference.

Example 13. The method of any of examples 10 and 11, further comprising: determining a net interference based on a difference between the total interference and the determined amount of in-network interference, and wherein outputting the interference information comprises outputting the net interference.

Example 14. The method of any of examples 9-13, wherein determining the amount of in-network interference comprises determining information indicative of airtime usage of the non-associated client device or the other access point.

Example 15. The method any of examples 9-14, wherein determining the amount of in-network interference comprises determining information indicative of airtime usage of the non-associated client device or the other access point, and amplitude of the communication signals from the non-associated client device or the other access point.

Example 16. The method any of examples 9-15, wherein the information identifying one or more non-associated client devices comprises media access control (MAC) addresses of the one or more non-associated client devices.

Example 17. A computer-readable storage medium storing instructions thereon that when executed cause one or more processors to: determine, for an access point, that communication signals outputted from a non-associated client device to another access point or from the other access point to the non-associated client device are being received by the access point based on stored information; determine an amount of in-network interference being generated by the communication signals based at least in part on the determination that the communication signals from the non-associated client device or from the other access point are being received by the access point; and output interference information based on the determined amount of in-network interference.

Example 18. The computer-readable storage medium of example 17, further comprising instructions that cause the one or more processors to determine a total interference on the access point.

Example 19. The computer-readable storage medium of example 18, further comprising instructions that cause the one or more processors to output information indicative of the total interference, and wherein the instructions that cause the one or more processors to output the interference information comprise instructions that cause the one or more processors to output the determined amount of in-network interference.

Example 20. The computer-readable storage medium of any of examples 18 and 19, further comprising instructions that cause the one or more processors to determine a net interference based on a difference between the total interference and the determined amount of in-network interference, and wherein the instructions that cause the one or more processors to output the interference information comprise instructions that cause the one or more processors to output the net interference.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" or "controller" as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A first access point for interference detection, the first access point comprising:
    memory configured to store information identifying one or more non-associated client devices that are not configured to communicate with the first access point; and
    one or more processors, implemented in circuitry, coupled to the memory and configured to:
        determine, based on the stored information, that communication signals outputted from a non-associated client device to a second access point or from the second access point to the non-associated client device are being received by the first access point, wherein the non-associated client devices and the second access point are communicating on a same current channel as the first access point and are configured to switch channels from the current channel to a same other channel together with the first access point in response to a determination to perform a communication channel switch;
        determine an amount of in-network interference being generated by the communication signals based at least in part on the determination that the communication signals from the non-associated client device or from the second access point are being received by the first access point, wherein the in-network interference includes interference occurring on the first access point based on the communication signals on the current channel and would occur on the first access point after switching to another channel; and
        output interference information based on the determined amount of in-network interference, the interference information usable for determining whether to perform the communication channel switch.

2. The first access point of claim 1, wherein the one or more processors are configured to determine a total interference on the first access point.

3. The first access point of claim 2, wherein the one or more processors are configured to output information indicative of the total interference, and wherein to output the interference information, the one or more processors are configured to output the determined amount of in-network interference.

4. The first access point of claim 2, wherein the one or more processors are configured to determine a net interference based on a difference between the total interference and the determined amount of in-network interference, and wherein to output the interference information, the one or more processors are configured to output the net interference.

5. The first access point of claim 1, wherein to determine the amount of in-network interference, the one or more processors are configured to determine information indicative of airtime usage of the non-associated client device or the second access point.

6. The first access point of claim 1, wherein to determine the amount of in-network interference, the one or more processors are configured to determine information indicative of airtime usage of the non-associated client device or the second access point, and amplitude of the communication signals from the non-associated client device or the other second access point.

7. The first access point of claim 1, wherein the information identifying one or more non-associated client devices comprises media access control (MAC) addresses of the one or more non-associated client devices.

8. The first access point of claim 1, wherein the one or more processors are configured to determine to perform the communication channel switch.

9. A method for interference detection, the method comprising:
    determining, for a first access point and based on stored information, that communication signals outputted from a non-associated client device of one or more non-associated devices to a second access point or from the second access point to the non-associated client device are being received by the first access point, wherein the non-associated client devices and the second access point are communicating on a same current channel as the first access point and are configured to switch channels from the current channel to a same other channel together with the first access point in response to a determination to perform a communication channel switch;
    determining an amount of in-network interference being generated by the communication signals based at least in part on the determination that the communication signals from the non-associated client device or from the second access point are being received by the first access point, wherein the in-network interference includes interference occurring on the first access point based on the communication signals on the current channel and would occur on the first access point after switching to another channel; and outputting interference information based on the determined amount of in-network interference, the interference information usable for determining whether to perform the communication channel switch.

10. The method of claim 9, further comprising determining a total interference on the first access point.

11. The method of claim 10, further comprising:
outputting information indicative of the total interference, and wherein outputting the interference information comprises outputting the determined amount of in-network interference.

12. The method of claim 10, further comprising:
determining a net interference based on a difference between the total interference and the determined amount of in-network interference, and wherein outputting the interference information comprises outputting the net interference.

13. The method of claim 9, wherein determining the amount of in-network interference comprises determining information indicative of airtime usage of the non-associated client device or the second access point.

14. The method claim 9, wherein determining the amount of in-network interference comprises determining information indicative of airtime usage of the non-associated client device or the second access point, and amplitude of the communication signals from the non-associated client device or the second access point.

15. The method claim 9, wherein the information identifying one or more non-associated client devices comprises media access control (MAC) addresses of the one or more non-associated client devices.

16. A non-transitory computer-readable storage medium storing instructions thereon that when executed cause one or more processors to:
determine, for a first access point and based on stored information, that communication signals outputted from a non-associated client device of one or more non-associated devices to a second access point or from the second access point to the non-associated client device are being received by the first access point, wherein the non-associated client devices and the second access point are communicating on a same current channel as the first access point and are configured to switch channels from the current channel to a same other channel together with the first access point in response to a determination to perform a communication channel switch;

determine an amount of in-network interference being generated by the communication signals based at least in part on the determination that the communication signals from the non-associated client device or from the second access point are being received by the first access point, wherein the in-network interference includes interference occurring on the first access point based on the communication signals on the current channel and would occur on the first access point after switching to another channel; and output interference information based on the determined amount of in-network interference, the interference information usable for determining whether to perform the communication channel switch.

17. The non-transitory computer-readable storage medium of claim 16, further comprising instructions that cause the one or more processors to determine a total interference on the access point.

18. The non-transitory computer-readable storage medium of claim 17, further comprising instructions that cause the one or more processors to output information indicative of the total interference, and wherein the instructions that cause the one or more processors to output the interference information comprise instructions that cause the one or more processors to output the determined amount of in-network interference.

19. The non-transitory computer-readable storage medium of claim 17, further comprising instructions that cause the one or more processors to determine a net interference based on a difference between the total interference and the determined amount of in-network interference, and wherein the instructions that cause the one or more processors to output the interference information comprise instructions that cause the one or more processors to output the net interference.

* * * * *